United States Patent [19]

Hunley, Jr. et al.

[11] Patent Number: 4,907,769
[45] Date of Patent: Mar. 13, 1990

[54] FLASHLIGHT HOLDER

[75] Inventors: Eugene C. Hunley, Jr., Rogers, Ak.; Eddie W. Derryberry, Greenwood, S.C.; Charles D. Wachs, Montgomery, Ala.; David A. Patton; Richard L. Bennett, both of Tallassee, Ala.

[73] Assignee: dreEDco, Inc., Tallassee, Ala.

[21] Appl. No.: 267,389

[22] Filed: Nov. 4, 1988

[51] Int. Cl.$^4$ .............................................. F16H 11/10
[52] U.S. Cl. ................... 248/185; 248/206.5; 248/316.7; 248/122
[58] Field of Search ................. 248/185, 206.5, 206.3, 248/205.5, 316.7, 188, 229, 288.3, 102, 103, 105, 106, 501, 347, 359 E, 649, 676, 188.7, 188.3, 189, 357, 122

[56] References Cited

U.S. PATENT DOCUMENTS

| 1,329,816 | 2/1920 | Winslow | 248/103 |
|---|---|---|---|
| 1,561,554 | 11/1925 | Little | 248/206.5 X |
| 1,797,154 | 3/1931 | Nuttall | 248/359 E |
| 2,219,370 | 10/1940 | Pierce, Jr. | 248/206.5 X |
| 2,247,131 | 6/1941 | Muldoon | 248/359 E |
| 2,434,440 | 1/1948 | Schafranek | 248/359 E |
| 3,638,889 | 2/1972 | Samuelson | 248/185 X |
| 3,658,283 | 4/1972 | Martin | 248/185 X |

FOREIGN PATENT DOCUMENTS

| 372132 | 3/1923 | Fed. Rep. of Germany | 248/188.9 |
|---|---|---|---|
| 406097 | 2/1934 | United Kingdom | 248/206.5 |

*Primary Examiner*—Ramon S. Britts
*Assistant Examiner*—Karen J. Chotkowski
*Attorney, Agent, or Firm*—Jones, Day, Reavis & Pogue

[57] ABSTRACT

A flashlight holder includes a C-shaped clamp that holds a flashlight by friction. The clamp is attached by an angled arm to a tripod that supports the arm in a fixed position of choice. Magnet assemblies in the legs of the tripod are mounted so as to swivel, allowing the flashlight holder to be secured by magnetic force to a ferromagnetic surface. The flashlight holder is preferably made of low-density polypropylene, which is both inexpensive to buy and easy to mold in molds that require little or no relief. The angled arm makes it easy to set a flashlight at any orientation with respect to an iron or steel surface to provide light to work on car and truck engines and the like.

1 Claim, 2 Drawing Sheets

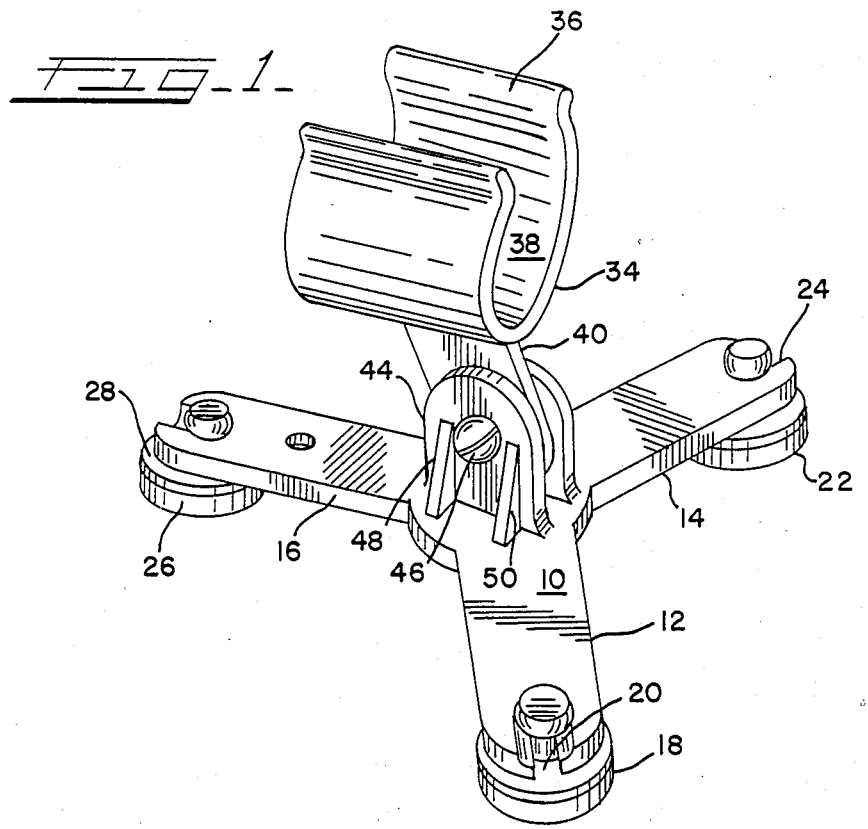
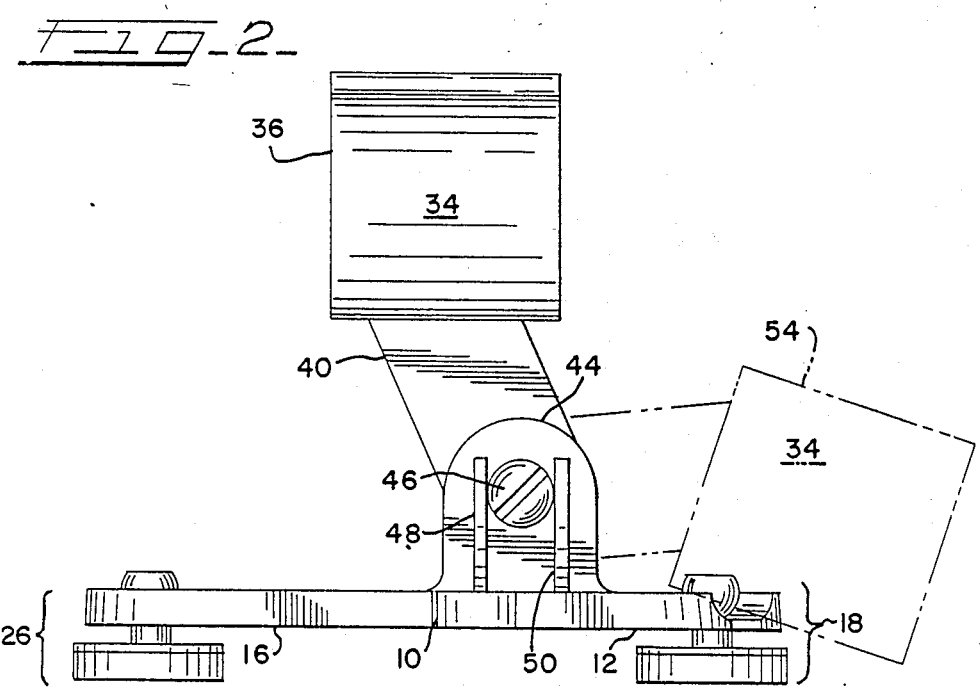

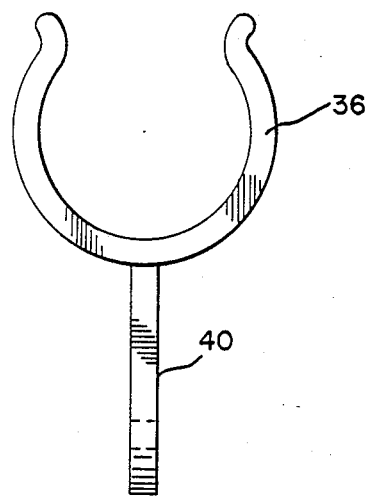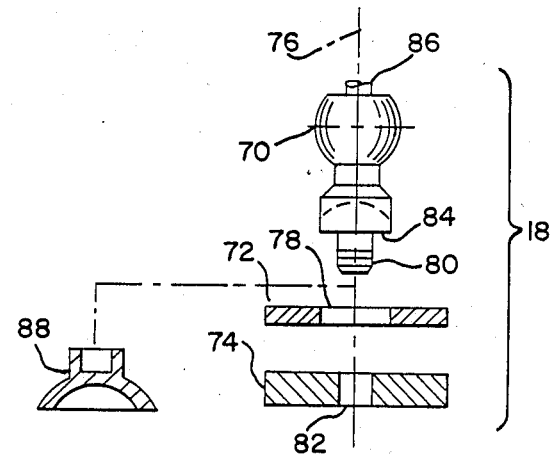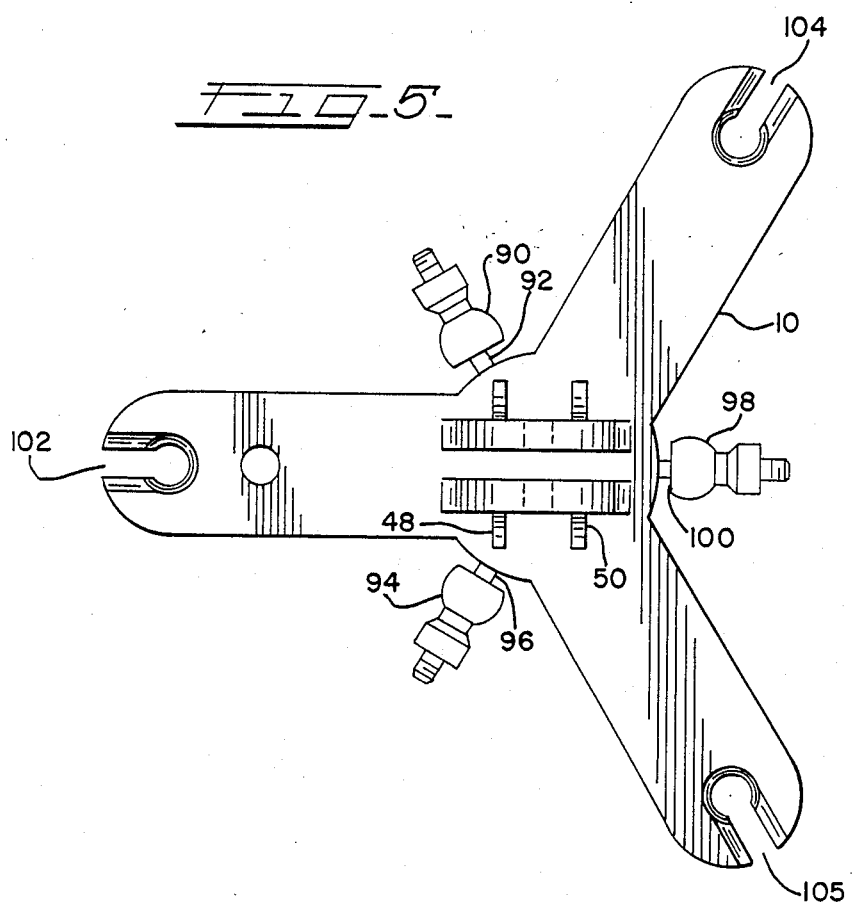

FLASHLIGHT HOLDER

BACKGROUND OF THE INVENTION

This invention relates to holders for flashlights. In particular, it is an improved flashlight holder for use around motor vehicles, furnaces, refrigeration equipment, boats or any structures of iron, steel or other ferromagnetic materials where light is required to do work.

Repair of car, truck or tractor engines, heating or refrigeration machinery, and many similar types of equipment often requires a source of light where the work is being done. This need is often met by a so-called trouble light, which is a shielded screened light bulb and socket that is typically combined with a long extension cord. However, some installations where work needs to be done lack a supply of AC power. Other such installations may present conditions such as the presence of explosive vapors under which a trouble light may present unacceptable hazards. A solution to these problems is supplied by mounting a flashlight in a holder that can be positioned to direct light from the flashlight into an area where light is needed.

An example of such a flashlight holder is given in U.S. Pat. 4,506,317 entitled "Magnetic Support For Flashlight." This is a service light having a magnetic base, a C-shaped resilient clamp support for a flashlight and an arm that is connected by pivots at each end to the clamp and to the magnetic base. The flashlight holder of the '317 patent has several disadvantages that are overcome by the present invention. Among these are the use of a single magnet to attach the flashlight holder to a ferromagnetic material. This is not well adapted for attachment to curved surfaces. A second disadvantage is the existence of a pivot near the magnet at one end of an elongated arm that represents a significant moment arm through which to apply torque to the pivot. A third disadvantage of the teachings of the '317 patent is the use of a relatively large number of parts.

Other patents embodying some of the general principles of the present invention include U.S. Pat. No. 3,917,940 entitled "Magnetic Base Utility Lamp." This is a line-powered light that is mounted through a sequence of pivots to a flat permanent magnet to secure the utility lamp in position at a work place. The apparatus taught by this patent must be connected to the power line to work.

U.S. Pat. No. 2,300,915, entitled "Flashlight Stand or The Like," represents a form of tripod stand for holding a flashlight in a position that is substantially horizontal with respect to a support surface. The components of the '915 patent are all metal, which represents a disadvantage when working around engines that have electrical components or around other equipment containing electrical terminals that may be short-circuited by contact with the metal. The '915 patent is also designed to rest on a horizontal surface, and does not teach any means for attaching or securing the tripod to a surface that is not horizontal.

U.S. Pat. No. 4,220,304, entitled "Attachment For Electric Torches," represents a magnetic mount for a flashlight that clamps to the flashlight to hold it in a position parallel to a steel or other ferromagnetic surface. The flashlight of the '304 patent cannot be placed in any orientation other than parallel to the attaching surface.

U.S. Pat. No. 2,402,877, entitled "Adjustable Flashlight Holder," is a clamp that is intended to secure a flashlight to the steering column of an automobile or the like to keep the flashlight ready to use. The holder of the '877 patent also has a suction cup for affixing the flashlight holder to a surface when the flashlight is in use, but the teachings of the patent are directed more to storing a flashlight than to holding the flashlight in a working position.

The flashlight holders described in the patents listed above share one or more of several defects that are overcome by the present invention. Some of the holders are made of metal, which may represent a short circuit if it comes in contact with live electrical terminals. Some of the holders apply a relatively large torque about a pivot as a result of the combination of the weight of a flashlight and the length of a moment arm. This requires a relatively large force to lock the pivot against unwanted rotation. Some of the holders that are described include a relatively large number of parts, which leads to manufacturing complexities.

SUMMARY OF THE INVENTION

It is an object of the present invention to provide a better flashlight holder.

It is a further object of the present invention to provide a flashlight holder that is relatively simple to manufacture.

It is a further object of the present invention to provide a flashlight holder that is readily manufactured from a plastic material such as low-density polyethylene.

It is a further object of the present invention to provide a flashlight holder with a magnetic tripod support that is easy to secure to curved iron or steel surfaces.

Other objects will become apparent in the course of a detailed description of the invention.

A portable holder for a flashlight includes a tripod containing three permanent magnet assemblies attached to the tripod with swivel mounts. A C-shaped flashlight holder is mounted by an offset bracket to a pivot that is connected to the tripod. The offset bracket allows a flashlight to be placed at any angle with respect to a mounting surface while keeping the center of gravity of the flashlight near the pivot. In a preferred embodiment, the main components of the flashlight holder are injection-molded of a low-density polypropylene, and the permanent magnets are made of ferrite powder molded in rubber or a similar flexible organic material. A screw is selected to allow the adjustment of frictional force on the pivot by using a coin as a screwdriver. A hole in a leg of the tripod allows the holder to be hung on a hook or nail for storage or use.

BRIEF DESCRIPTION OF THE DRAWINGS

FIG. 1 is a perspective view of the flashlight holder of the present invention.

FIG. 2 is a side view of the flashlight holder of the present invention.

FIG. 3 is an end view of the holder clamp of FIG. 2.

FIG. 4 is an exploded view of a magnet post of the present invention.

FIG. 5 is a top view of the tripod of the present invention as molded.

DETAILED DESCRIPTION OF THE INVENTION

FIG. 1 is a perspective view of a preferred embodiment of the flashlight holder of the present invention. In FIG. 1, a tripod 10 has three legs 12, 14 and 16. The use of a tripod 10 makes it possible to mount the flashlight holder on a curved surface. The leg 12 has a magnet mount 18 that snaps into a slot 20. The slot 20 permits some relative motion of the magnet 18 with respect to the leg 12 so as to fit the flashlight holder to a curved surface. Similarly, a magnet mount 22 is placed in a slot 24 in the leg 14, and a magnet mount 26 is placed in a slot 28 of the leg 16. The magnet mounts 18, 22 and 26 hold the tripod 10 to an iron or steel surface.

A holder 34 comprises a C-shaped clamp 36 that is sized to fit and hold a flashlight. In the preferred embodiment, the clamp 36 has an interior surface 38 that is substantially the surface of a portion of a cylinder that spans more than 180°, typically about 270°, and the clamp 36 is sized to fit the outside of a standard D-cell flashlight. It should be evident that the clamp 36 can be shaped to fit any convenient size. The flashlight holder of the present invention is expected to find the most use in holding the standard two- or three-cell flashlights.

The clamp 36 of the holder 34 is attached to an arm 40 that fits into a bracket 44 of the tripod 10. A screw 46 engages a nut that is not visible in FIG. 1 to squeeze the bracket 44 against the arm 40 to maintain the holder 36 in a fixed position. The bracket 44 receives support from a pair of buttresses 48 and 50. The buttresses 48 and 50 are spaced apart a distance that is slightly greater than the flat-to-flat distance of a nut that is to be attached to the screw 46 and a comparable pair of buttresses that are hidden in the view of FIG. 1 is similarly spaced to prevent such a nut from turning. In a flashlight holder that was built for the practice of the present invention, the screw 46 was a ¼ inch-20 UNC round-head screw, ¾ inch long, made of steel plated with zinc or cadmium. A hexagonal nut, also ¼ inch-20 UNC, secured the screw 46 in place. The flat-to-flat spacing of such a nut is specified to be 0.437 inches and such a nut is prevented from turning by spacing the buttresses 48 and 50 and their unseen counterparts a distance of approximately ½ inch apart. The use of a ¼-inch 20 UNC screw is especially convenient because its slot is sized to fit a dime, permitting adjustment of frictional force on the pivot without the use of tools.

FIG. 2 is a side view of the flashlight holder of the present invention and FIG. 3 is an exploded view of a magnet mount of FIGS. 1 and 2. In FIG. 2 it can be seen that the legs 12 and 14 of the tripod 10 are in a plane, which makes it easier to form the tripod 10 in the bracket 44 by injection molding of low-density polyethylene. The holder 34 is shown in a position in which the clamp 36 is disposed substantially parallel to the plane of the legs 12 and 16. A phantom view 54 shows the holder 34 in a different position in which it is folded substantially flat. This makes the flashlight holder easier to pack for shipping. In FIG. 2 the buttresses 48 and 50 are seen to enclose the head of the screw 46. The magnet mounts 18 and 26 are identical, and the exploded view of FIG. 3 thus represents all of them. The magnet mount 18 of FIG. 3 includes a ball 70, a ferromagnetic washer 72 and a magnet 74, all of which exhibit cylindrical symmetry with respect to a centerline 76. The centerline 76 thus comprises a diameter of a partially spherical portion 77. A hole 78 in the washer 72 is large enough to clear the stud 80 on the ball 70, but a corresponding hole 82 on the center line of the magnet 74 makes an interference fit with the stud 80 to hold the washer 72 and the magnet 74 firmly against a shoulder 84 of the ball 70. The washer 72 is typically made of steel that is plated with an anti-corrosive compound such as zinc or cadmium, while the magnet 74 is preferably formed of a composite of barium ferrite or the like and rubber or a similar flexible plastic material. The washer 72 serves as a partial magnet keeper, providing a return path for magnetic flux that reduces the net air gap and thus increases the magnetic force that holds the magnet 74 to a ferromagnetic surface. The magnet 74 is normally magnetized so as to present poles at the flat surfaces. The axis of the poles is thus parallel to or coincident with the centerline 76. The ball 70 typically includes a piece of mold sprue 86, as it is of advantage to mold the ball 70 with and as a part of the tripod 10 of FIG. 2. This will become more apparent from examining FIG. 5, which is a top view of the tripod 10 as it is molded.

The stud 80 may also be pressed into a suction cup 88 to adapt the flashlight holder of the present invention for use on surfaces such as the fiberglass or wood of a boat or some automobile bodies. In such a case, the suction cup 88 is typically made of a soft, flexible material such as polyurethane or a natural or synthetic rubber. The suction cup 88 may be held in place by a press fit or the stud 80 may be glued into the suction cup 88 to hold it securely.

In FIG. 5 a ball 90 is connected by a sprue 92 to the tripod 10, a ball 94 is connected by a sprue 96 to the tripod 10 and a ball 98 is connected by a sprue 100 to the tripod 10. After the tripod 10 with the attached balls 90, 94 and 98 is molded, the three balls 90, 94 and 98 are broken off at the sprues 92, 96 and 100 and assembled into washers and magnets as shown in FIG. 4 to produce magnet mounts 18, 22 and 26 of FIG. 1. These magnet mounts are then assembled into the slots 102, 104 and 106 respectively of FIG. 5. FIG. 5 also shows a hole 108 that is molded into the leg 12. The hole 108 is useful for hanging the flashlight holder for storage on a hook or nail. It may also be convenient to hang the flashlight holder by a hook through the hole 108 to hold a flashlight if neither a horizontal surface nor a ferromagnetic surface is available to support the flashlight holder.

The magnets 74 of FIG. 4 enable the flashlight holder of the present invention to be used on iron or steel surfaces that are not level. They are preferably selected to have a pull-apart force of the order of a pound, which will allow the use of the flashlight holder to support its weight and the weight of a typical flashlight upside down. It should be evident that the flashlight holder will also function as a stand to hold a flashlight on a substantially horizontal surface that is not ferromagnetic.

The description given here of the preferred embodiment of the invention is intended to illustrate the invention. This description is not intended to limit the scope of the invention, which should be interpreted in accordance with the appended claims.

We claim:
1. A flashlight holder comprising:
 (a) a plurality of legs connected to form a tripod;
 (b) a bracket connected to the tripod;
 (c) a clamp having a C-shaped portion;

(d) an arm connected to the clamp and adapted to be connected movably to the bracket;
(e) means for locking the arm in a fixed position with respect to the bracket; and
(f) a plurality of magnet mounts, one of each of the magnet mounts connected to one of each of the legs to secure the tripod to a ferromagnetic surface, each of the magnet mounts including a substantially cylindrical permanent magnet having a cylindrical portion removed on an axis of the magnet to form a first hold, a ferromagnetic disc having an outer diameter substantially equal to a diameter of the permanent magnet and having a circular portion removed to form a second hole that is larger than the first hole, and a plastic ball having a shoulder and a stud, the shoulder and stud having cylindrical symmetry about a center line, the plastic ball having a partially spherical portion with a diameter along the center line, the stud sized to clear the second hole and make an interference fit with the first hole to hold the magnet mount together.

* * * * *